United States Patent
Vaikunta Raman et al.

(10) Patent No.: US 12,277,568 B2
(45) Date of Patent: Apr. 15, 2025

(54) SYSTEMS AND METHODS FOR DETERMINING LIFETIME VALUE OF WEBSITE VISITOR THROUGH MACHINE LEARNING

(71) Applicant: TRUECAR, INC., Santa Monica, CA (US)

(72) Inventors: Praveen Palaniyappan Vaikunta Raman, Los Angeles, CA (US); Sharat Nair, Torrance, CA (US); Nicholas Sarnoff, Los Angeles, CA (US)

(73) Assignee: TrueCar, Inc., Santa Monica, CA (US)

( * ) Notice: Subject to any disclaimer, the term of this patent is extended or adjusted under 35 U.S.C. 154(b) by 344 days.

(21) Appl. No.: 17/566,471

(22) Filed: Dec. 30, 2021

(65) Prior Publication Data

US 2022/0207541 A1 Jun. 30, 2022

Related U.S. Application Data

(60) Provisional application No. 63/132,734, filed on Dec. 31, 2020.

(51) Int. Cl.
*G06Q 30/00* (2023.01)
*G06N 20/00* (2019.01)
*G06Q 30/0201* (2023.01)

(52) U.S. Cl.
CPC ......... *G06Q 30/0201* (2013.01); *G06N 20/00* (2019.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 8,417,715 B1* | 4/2013 | Bruckhaus | G06Q 10/04 705/26.1 |
| 2014/0019228 A1* | 1/2014 | Aggarwal | G06Q 30/0244 705/14.43 |
| 2016/0342911 A1* | 11/2016 | Kannan | G06Q 10/0631 |
| 2018/0053264 A1* | 2/2018 | Rowley | G06Q 20/381 |
| 2020/0065848 A1* | 2/2020 | Gupta | G06Q 30/0224 |
| 2021/0350307 A1* | 11/2021 | Price | G06Q 10/06398 |

* cited by examiner

*Primary Examiner* — Mustafa Iqbal
(74) *Attorney, Agent, or Firm* — Sprinkle IP Law Group

(57) ABSTRACT

A vehicle data system receives a lead submission through a website supported by the vehicle data system and determines, utilizing a machine learning model, a user value for a lead associated with the lead submission. The user value represents a probability of the lead purchasing a vehicle from a dealer through the website. The vehicle data system determines a user lifetime value for the lead based at least on the user value for the lead. Subsequently, the vehicle data system obtains clickstream identifiers from a search engine and assigns a corresponding user lifetime value to each clickstream identifier. The vehicle data system aggregates the clickstream identifiers and corresponding user lifetime values in a single file and communicates the single file to a search server for consumption. The user lifetime values are utilized by the search engine in search engine marketing processes.

20 Claims, 12 Drawing Sheets

Shop New  Shop Used ( Brand )  Body Type

| | |
|---|---|
| AccelerX | Motera |
| AlphaCar | Mercell |
| Autogem | MINER |
| BMV | MINX |
| Borne | NeuDrive |
| Caddett | PowerSport |
| Chaser | RangeMaster |
| Crimson | SureCar |
| Durant | Tomera |
| Freely | Vorheez |
| Forge | Vowsled |
| Genericar | |
| GMR | |
| Hanza | |
| HowdyCar | |
| INVITA | |
| Jammer | |
| Jewel | |
| KingMotor | |
| Lander | |
| Luxus | |
| Lineway | |
| Looker | |
| Mastidon | |

Buy from Home: Have your vehicle delivered to you and complete your paperwork at home. Learn More New   Used   Sell or Trade   Research   |   🚚 (29)   alan ˅

Build The Car You Want. Know What Others Paid for it.

- Select your preferred make, model, trim, and options
- See actual cars that match your preferences
- View detailed pricing data from sales of similar cars, so you can recognize a great price

|   | A | B | C | D | E | F | G | H | I | J |
|---|---|---|---|---|---|---|---|---|---|---|
| 1 | Lead | User | Dealer | Monthly Fee of t | Probability of Sa | Life Time Value of the Lead | | | | Number of Leads |
| 2 | A | abby | X | $400 | 80% | $320 | | | | 0 |
| 3 | B | abby | Y | $300 | 10% | $30 | | | | 1 |
| 4 | | | | | | | | | | |
| 5 | Hanza Civil | Abby | $350 | | | | | | | |
| 6 | Tomera CRH | John | $100 | | | | | | | |
| 7 | | | | | | | | | | |
| 8 | | | | | | | | | | |
| 9 | | WebX Clickstream ID | | | | | | | | |
| 10 | | csasa | Hanza Civil | VDS SITE | $350 | | | | | |
| 11 | | John | Tomera CRH | VDS SITE | $100 | | | | | |
| 12 | | X | Hanza Jam | PARTNER SITE | $200 | | | | | |
| 13 | | | | | | | | | | |

FIG. 9

SYSTEMS AND METHODS FOR DETERMINING LIFETIME VALUE OF WEBSITE VISITOR THROUGH MACHINE LEARNING

CROSS-REFERENCE TO RELATED APPLICATION(S)

This application claims a benefit of priority under 35 U.S.C. § 119(e) from U.S. Provisional Application No. 63/132,734, filed Dec. 31, 2020, entitled "SYSTEMS AND METHODS FOR DETERMINING LIFETIME VALUE OF WEBSITE VISITOR," which is fully incorporated by reference herein for all purposes.

TECHNICAL FIELD

This disclosure relates generally to data analytics for online engagement with website visitors. In particular, this disclosure relates to systems, methods, and computer program products for determining the lifetime value of a website visitor, useful for meaningfully improving rankings of a website in search engine marketing processes with respect to website visitors who are likely to make a purchase through the website.

BACKGROUND OF THE RELATED ART

Consumers are becoming savvier. This is especially true in the context of online purchasing, where research is easily accomplished. Consumers have therefore taken to searching for products or sales outlets (also referred to herein as vendors, sellers, dealers, etc.) online before executing a purchase.

As the popularity of searching for products or dealers online before a consumer executes a purchase continues to grow, there is an increasing need to develop systems and methods for presenting candidate dealers based on a user's preference or characteristics of the user or dealer. However, when a user seeks a dealer from which he/she can make a purchase of a product (which may be an onsite purchase or an online purchase), the candidate dealers may have characteristics that may cause the user to prefer some dealers over others. In fact, certain characteristics may result in the likelihood of sale for some vendors to be small, negligible, or non-existent. Similarly, different features of a consumer may also result in a difference in the probability of the consumer buying from a particular vendor.

In view of the foregoing, there is a need to better match dealers and consumers whose interactions may involve both the online world and the physical world. This disclosure can address this need and more.

SUMMARY OF THE DISCLOSURE

Search engine marketing (SEM) refers to a type of Internet marketing approach for creating and/or editing a website so that search engines rank the website higher than other websites. The technology enables advertisers to bid on certain keywords or phrases and ensures that ads appear with the results of search engines. In recent years, more and more consumers are searching and making their purchases online, including high value durable goods such as cars.

For instance, a user may use online search tools to search for a car with a particular make, model, body type, and year. A website that provides automotive pricing and information for new and used car buyers may want an online search engine that conducts the search to include the website in the search results, with the website ranked higher than other websites in the search results returned by the online search engine to the user.

With the inclusion and increased visibility in the search results, the website would have a better chance that the user may actually visit the website. If the user does visit the website (e.g., by selecting the website from the search results), the user could submit a lead to the website. In response, the website can provide the lead to an affiliated dealer (or dealers) that carries the car having the particular make, model, and year searched by the user. However, the search engine does not know the likelihood of whether a sale of the car with the particular make, model, and year will actually occur between the user and the affiliated dealer.

A goal of the invention disclosed herein is to improve SEM processes so that, when a user conducts an online search of a particular vehicle year, make, and model through an Internet search engine, the search results provided by the search engine include a website that provides automotive pricing and information for new and used vehicles as one of the top results. Another goal of the invention disclosed herein is to provide the website with an ability to identify website visitors who are actually searching for a particular vehicle year, make, and model. This allows the website to better identify website visitors who are likely to convert (i.e., making a purchase) and direct those website visitors to dealers that are affiliated with the website and that have characteristics that likely will facilitate a sale (e.g., a dealer that has the particular vehicle year, make, and model in the inventory, a dealer that is the closest to a potential buyer, a dealer that has the highest incentive among competing dealers, etc.). In embodiments disclosed herein, these and other goals can be realized in a vehicle data system (VDS) that supports the website (which is referred to hereinafter as the VDS website) and that is configured for providing user lifetime values to the search engine.

Traditionally, a search engine assumes that all users who conduct online searches have the same conversion rate (i.e., the probability or likelihood of making a purchase), regardless of whether any of the users actually ended up buying a car. However, in reality, some people are far more likely to convert to a sale than others.

To this end, the invention disclosed herein takes a website visitor's browsing behavior into consideration (e.g., how a website visitor interacts with the VDS website prior to expressing an interest to make a purchase), determines the website visitor's lifetime value in view of the website visitor's likelihood to convert, and provides the website visitor's lifetime value to a search engine. The search engine, in turn, can utilize the website visitor's lifetime value, in addition to the website visitor's search parameters and/or search history which the search engine already has, in processing search queries from other users which contain the same or similar search parameters.

In some embodiments, a vehicle data system implementing the invention disclosed herein is operable to prepare datasets for training and testing a machine learning model. The datasets contain user-related features that capture user behaviors in browsing the website supported by the vehicle data system, dealer-related features that facilitate selecting appropriate dealers per lead submission, and vehicle-related features that identify a particular vehicle model segment and a particular vehicle type. In some embodiments, the datasets are divided into a training dataset for training the machine learning model and a test dataset for testing the machine learning model. In some embodiments, the machine learning model implements an algorithm for gradient boosting on decision trees. In some embodiments, the machine learning model is continuously trained and tested on a periodic basis. Once trained, the machine learning model can model and predict how likely a user is to make a purchase through a website supported by the vehicle data system. The machine learning model generates a user value that represents a probability of such a sale.

In some embodiments, the vehicle data system receives a lead submission through a website supported by the vehicle data system and determines, utilizing the machine learning model, a user value for a lead associated with the lead submission. The user value represents a probability of the lead purchasing a vehicle from a dealer through the website. Based at least on the user value for the lead, the vehicle data system can determine a user lifetime value for the lead.

In some embodiments, the vehicle data system is operable to obtain clickstream identifiers associated with a plurality of clickstreams from a search engine. For each of the clickstream identifiers, the vehicle data system assigns a corresponding user lifetime value. The clickstream identifiers and corresponding user lifetime values are aggregated in a single file, such as a file having a comma-separated values format. In some embodiments, each line of the file is a data record containing a clickstream identifier and a corresponding lifetime value. The vehicle data system communicates the file to a search server on which the search engine operates. The user lifetime values can be utilized by the search engine in SEM processes to improve search results.

In one embodiment, a system may comprise a processor, a non-transitory computer-readable storage medium, and stored instructions translatable by the processor to perform a method substantially as described herein. Another embodiment comprises a computer program product having a non-transitory computer-readable storage medium storing instructions translatable by a processor to perform a method substantially as described herein. Other implementations are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 2 and FIG. 3 show examples of websites supported by a vehicle data system according to some embodiments disclosed herein.

FIG. 4 shows an example of a page where website visitors can select and navigate to different vehicle manufacturer pages of a website supported by a vehicle data system according to some embodiments disclosed herein.

FIG. 6 shows an example of a page where various filters, including mileage and condition, can be used to filter search results pertaining to a used vehicle according to some embodiments disclosed herein.

FIG. 9 shows by example how a user value generated by a machine learning model for a lead can be used to compute a lifetime value of the lead according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
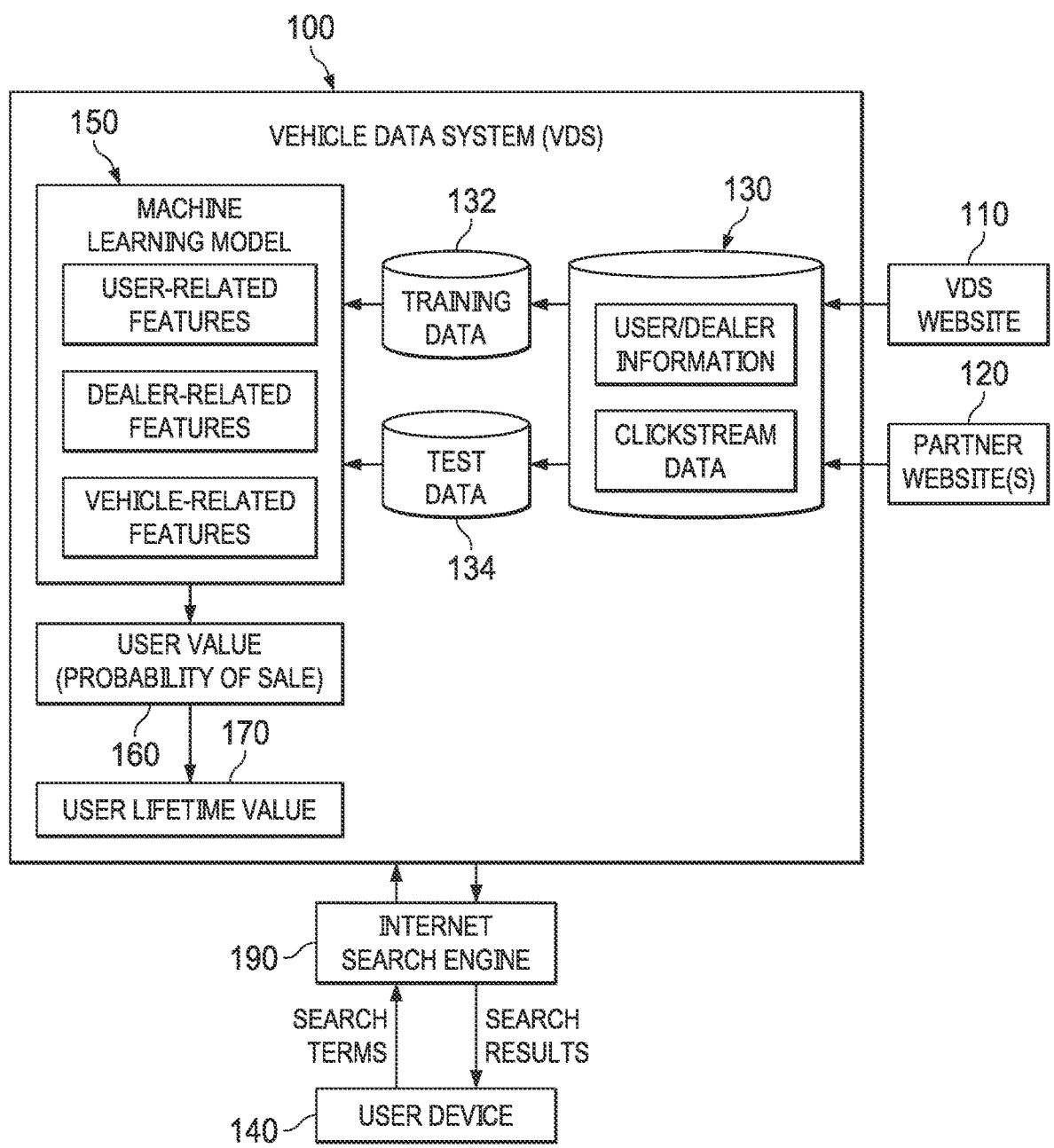
FIG. 1 depicts a diagrammatical representation of an example of a vehicle data system according to some embodiments disclosed herein.

FIG. 1 depicts a diagrammatical representation of an example of a VDS 100 according to some embodiments disclosed herein. As illustrated in FIG. 1, VDS 100 is operable to support a VDS website 110 and/or partner website(s) 120 that provide automotive pricing and information for new vehicles and/or used vehicles.

In some embodiments, VDS 100 is configured for keeping track of how any individual website visitors arrive at a website supported by the VDS, monitoring how they interact with certain features of the website, and using a website visitor's engagement information to predict whether the website visitor is likely to buy a vehicle through the website. In some embodiments, a website supported by the VDS is operable to collect a website visitor's clickstream as the website visitor browses through the website and communicates the clickstream data to the VDS. In turn, the VDS may store the clickstream data and any user information that the website visitor provided through the website in a data store 130. In some embodiments, data store 130 may centrally store information about dealers affiliated with the website(s) supported by the VDS. This information can include details about what vehicles are in the inventory of a dealer, what incentive program(s) a dealer is currently offering, historical transactions of vehicles sold by a dealer, etc.

In some embodiments, VDS 100 further includes a machine learning model 150. As described below, machine learning model 150 may take datasets stored in data store 130 as input (e.g., training data 132, test data 134) to learn (i.e., model and predict) about user behavior (e.g., the time of the day a website visitor visits the website, the day of the week the website visitor visits the website, the frequency of the website visitor's visits to the website, etc.). By analyzing the website visitor's clickstream data, machine learning model 150 can understand what the website visitor is viewing on the website and, based on this understanding and model and predict whether the website visitor is interested in a particular vehicle year, make, model, etc. In some embodiments, inputs to machine learning model 150 can also include features about each dealer (e.g., a dealer's close rate based on historical transactions within a window of time, etc.) and how each dealer relates to the website visitor (e.g., the driving distance between the website visitor and a candidate dealer, the number of dealers in the same geographical location (e.g., zip code, city, etc.) as the website visitor).

In some embodiments, features used in machine learning model 150 can be categorized into three types: user-related, dealer-related, and vehicle-related. These are further described below. In some embodiments, machine learning model 150 may implement a boosting-based algorithm such as CatBoost. CatBoost is an algorithm for gradient boosting on decision trees and is known to those skilled in the art and thus is not further described herein.

In some embodiments, training of machine learning model 150 may take place once a week based on data from a past time window (e.g., six months). In some embodiments, machine learning model 150 is run daily to generate predictions for leads from the previous day. In some embodiments, machine learning model 150 is operable to generate a user value 160 which indicates the probability of sale. Outputs from machine learning model 150 can be stored in data store 130. As a non-limiting example, data store 130 may be implemented as a cloud-based database hosted by a cloud computing platform. Outputs from machine learning model 150 can be used in conjunction with some other factors to determine a user's lifetime value 170. In some embodiments, VDS 100 may provide the user's lifetime value to a search engine (or search engines) 190. Search engine 190, in turn, can utilize the user's lifetime value in conducting a search in response to a search request from a user device 140, allowing search engine 190 to provide improved search results that better match the user's needs.

Figure 2:
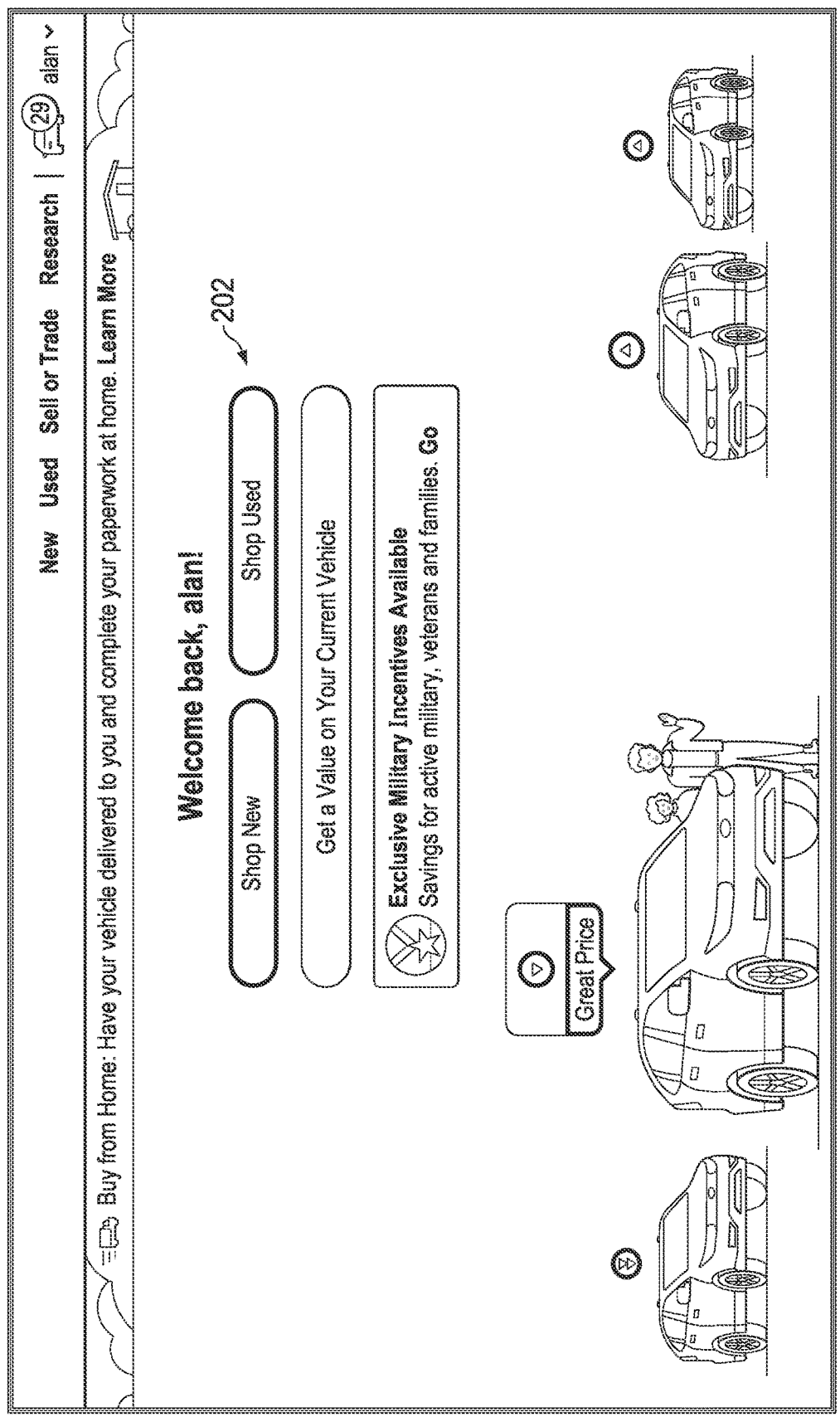
Figure 3:
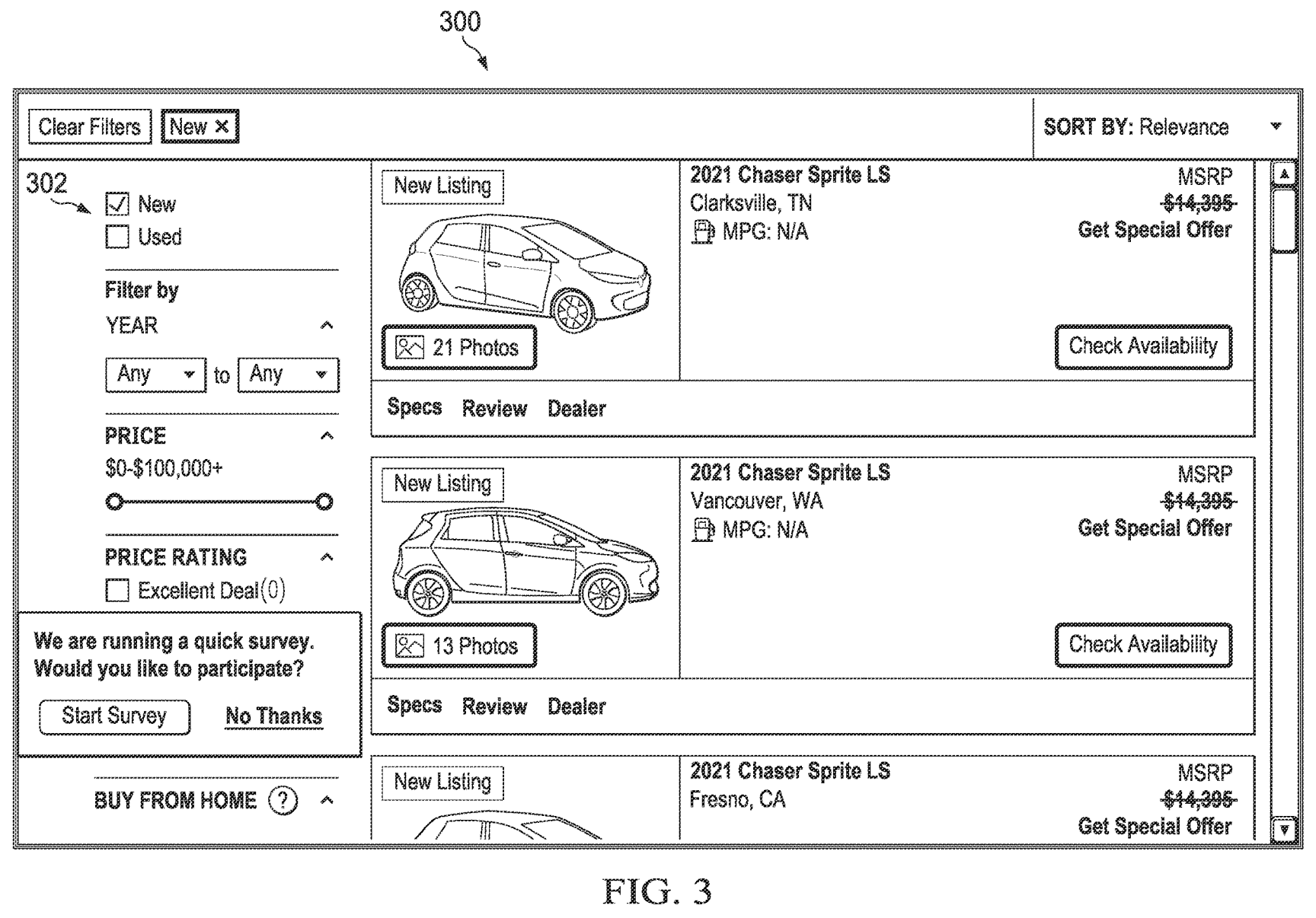

FIG. 2 shows an example of a home page 200 for a VDS website and FIG. 3 shows an example search page 300 of a partner website. Website visitors may search these websites for new and/or used vehicles. For instance, if a website visitor wants to buy a new vehicle (as opposed to a used vehicle), the website visitor can select "new car" from a menu provided by a respective website (e.g., menu 202 of home page 200, menu 302 of search page 300).

Figure 5:
FIG. 5 shows an example of a page where a user-specified configuration of a new vehicle is displayed according to some embodiments disclosed herein.

The website visitor can then select a certain make. FIG. 4 shows a non-limiting example of a make page 400 where the website visitor can select and navigate to different vehicle manufacturer pages of the VDS website. Each vehicle manufacturer page is configured for the website visitor to select a desired make, model, trim, and options and view inventory vehicles that match the desired vehicle configuration. FIG. 5 shows an example page 500 showing a user-specified configuration of a new vehicle. Whatever the website visitor selects, each selection becomes a data point in the user's clickstream.

Figure 6:
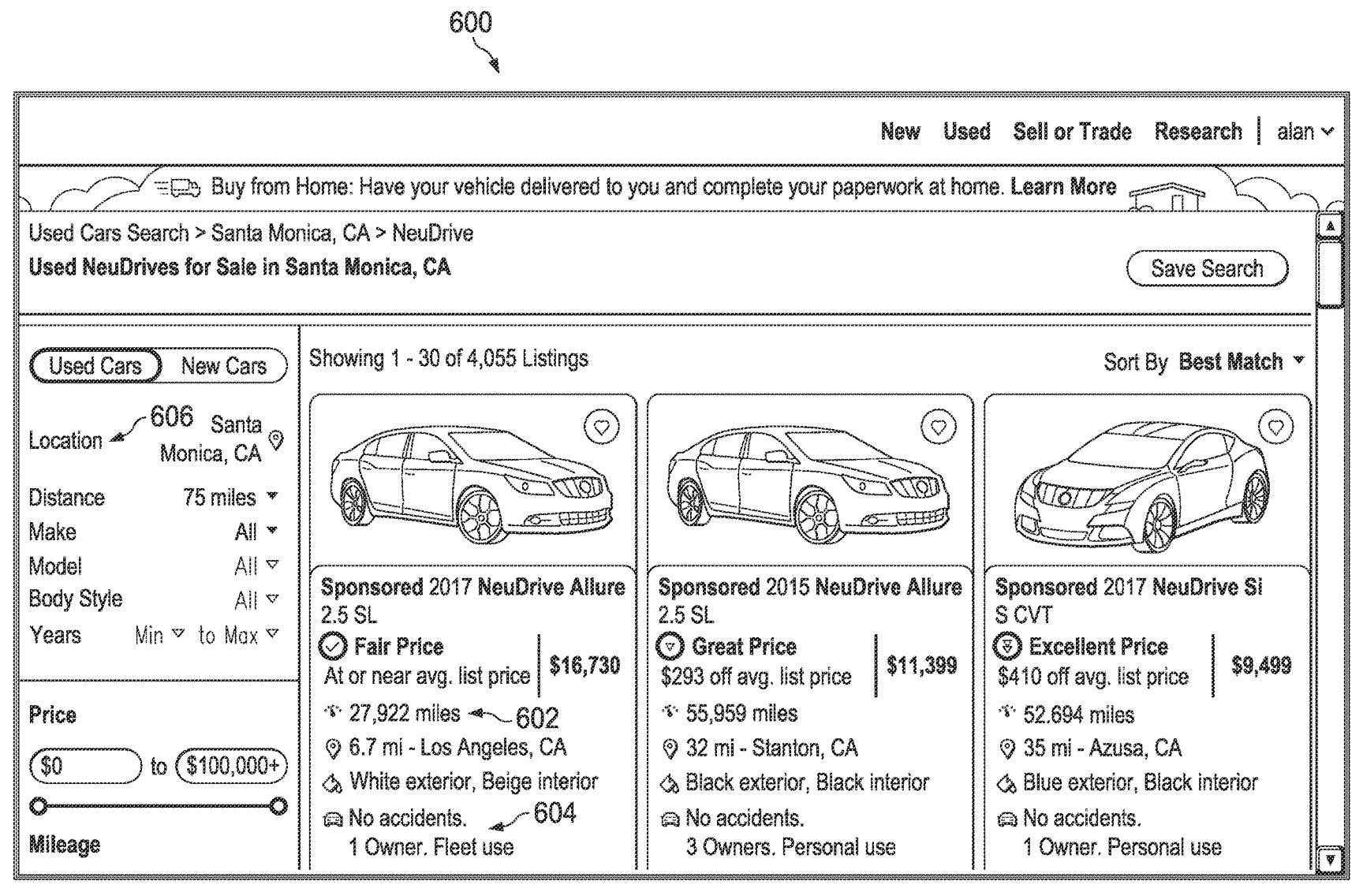

For used vehicles, the VDS website may keep track of additional features such as mileage, condition, etc., as shown in FIG. 6 (e.g., mileage 602, condition 604). A website visitor's location (e.g., zip code, city and state, etc.), whether provided by the website visitor or programmatically determined through the website visitor's browser, can be used to filter the results (e.g., location 606 shown in FIG. 6) according to some embodiments disclosed herein.

As a website visitor navigates and finds information on the VDS website to configure a desired new vehicle and/or find an ideal used vehicle, the sequence of hyperlinks that the website visitor follows on the VDS website (e.g., as illustrated in FIG. 2 to FIG. 5) can be captured and stored as clickstream data. When the website visitor expresses an interest in a product (e.g., a new vehicle or a used vehicle), the website visitor can submit a lead to the VDS website. This is shown in FIG. 7A.

Figure 7A:
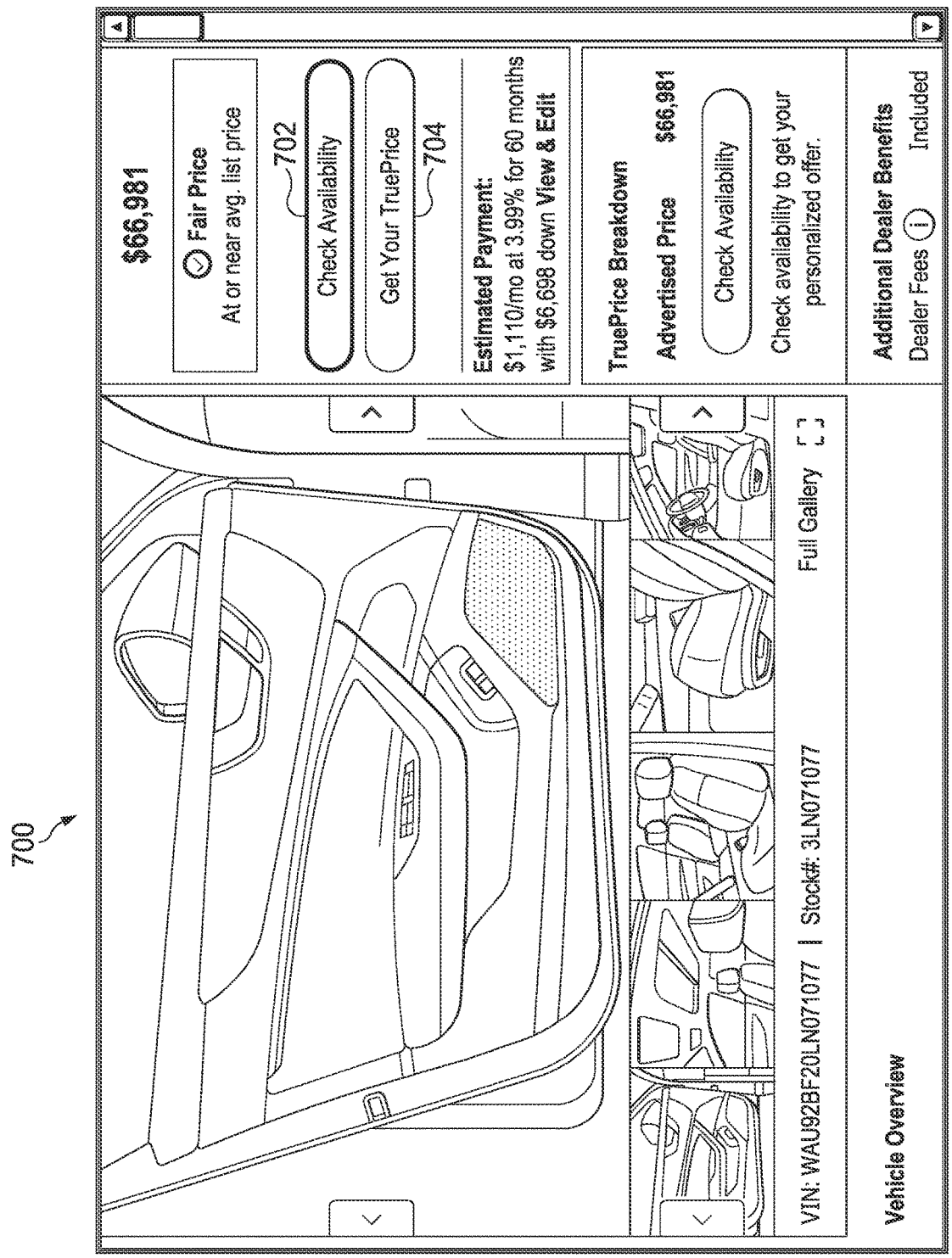
FIG. 7A shows an example of a product page which displays information about an actual vehicle having a user-specified vehicle configuration according to some embodiments disclosed herein.
Figure 7B:
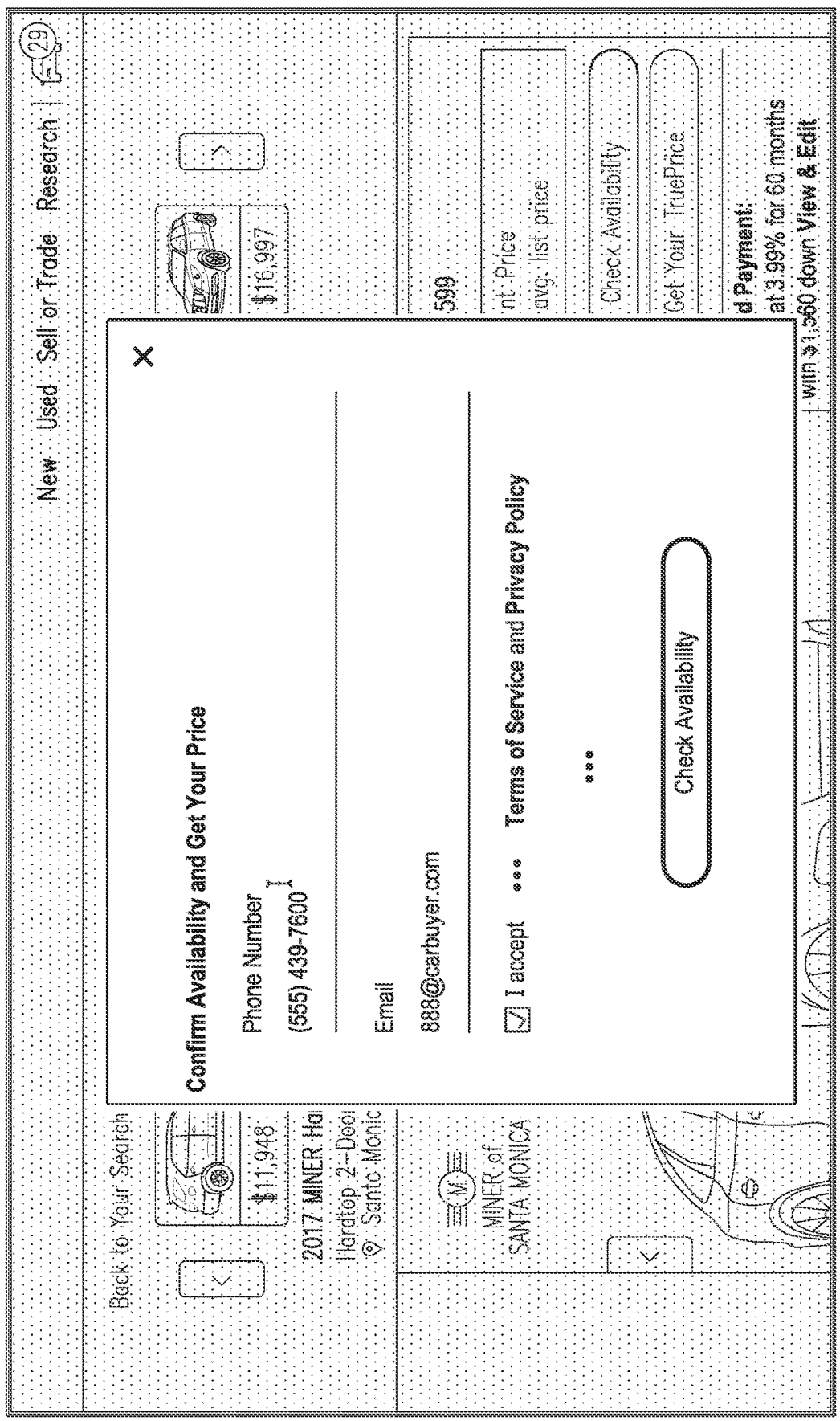
FIG. 7B illustrates how a user is prompted to provide user information according to some embodiments disclosed herein.

FIG. 7A shows an example of a product page 700 which displays information about an actual vehicle having a user-specified vehicle configuration according to some embodiments disclosed herein. As illustrated in FIG. 7A, the user may express their interest in the actual vehicle by selecting a user interface element (e.g., by clicking on "Check Availability" button 702) or getting a price quote for the vehicle (e.g., by clicking on "Get Your TruePrice" button 704). As shown in FIG. 7B, the user is prompted to provide user information (e.g., phone number, email address, etc.). The user-provided user information is also captured and stored on the VDS.

Previously, user interaction data was not used in optimizing the VDS website's bidding process for SEM. When a user submits a lead to the VDS website, the VDS website passes information about the lead to a search engine (e.g., the user's phone number and the specific configuration of a vehicle that is of interest to the user, such as location, make, model, distance, body style, and year—basically any feature on the VDS website that the user has selected or clicked). With the invention disclosed herein, in addition to the information about a lead, the VDS website also provides a score for the lead (referred to in FIG. 1 as user value 160) that represents how the lead is likely to convert.

As discussed above, when a user clicks "check availability" on a product page of a VDS website (or a partner website supported by the VDS), the user is submitting a lead to the VDS (e.g., the user is inquiring a dealer whether the vehicle is available or not). In some embodiments, the VDS may be configured to target users who have expressed interest in making a purchase and provided their personally identifiable information (PII). The VDS passes information about these users, including their PII, to the search engine. In some embodiments, the VDS may be configured to also target users who have not specifically expressed interest in making a purchase, but have otherwise interacted with a website supported by the VDS.

A goal here is to differentiate users who are likely to convert versus who are not. One way to do so is by observing how each user interacts with a website supported by the VDS. For example, a user may navigate to view a particular vehicle and navigates back to view another vehicle. Another user may already know what they want, so they may navigate to a particular vehicle and may proceed to explore the details of the vehicle without navigating to another vehicle. These user behaviors (e.g., click paths) are captured in the clickstream data. The VDS is operable to analyze such browsing behaviors (e.g., the number of unique page viewed, the number of leads sent, etc.) to understand, through machine learning, the user's browsing behavior and, based on that understanding, determine how likely they are to convert (e.g., probability of sale).

In some embodiments, specific information with respect to the make, model, body type, year (e.g., whether a user viewed an Audi versus a BMW) is not used in determining the probability of sale. Rather, the VDS utilizes the number of unique pages viewed (e.g., a maker page), the number of session visited, e.g., how many times a user visited in a time period, number of leads sent, location, etc. Below is a list of features used by the VDS for machine learning modeling.

As a non-limiting example, features used by the VDS for machine learning modeling can include the following:

User-related features can include: device category (e.g., mobile phone vs. desktop computer), viewed marketplace (e.g., new vehicle listing page or used vehicle listing page—this is a feature that identifies whether a user viewed a new vehicle page or a used vehicle page), user source segment (e.g., VDS vs. partner website), number of unique pages viewed, number of sessions visited, number of price report pages viewed (e.g., via the VDS website or a partner website), number of leads sent (prior), day of week of lead submission, day of week of first visit, etc. These user-related features can capture user behaviors in interacting with the VDS website or the partner website.

Dealer-related features can include: the distance between a user and a dealer, the close rate of a dealer (adjusted by distance), the close rate from a dealer selection algorithm (DSA) (true or false), dealer type (franchise or independent), billing model (subscription or pay-per-sale), etc. A non-limiting example of a DSA can be found in U.S. patent application Ser. No. 17/516,368, filed Nov. 1, 2021, entitled "MACHINE LEARNING SYSTEMS AND METHODS FOR SELECTION, FILTERING OR PRESENTATION OF AVAILABLE SALES OUTLETS IN A DISTRIBUTED NETWORKED COMPUTING ENVIRONMENT," which is incorporated by reference herein. A website supported by the VDS may consider franchise dealers as well as independent dealers. This has more to do with how each dealer structures itself. Franchise dealers typically have a better ability than independent dealers to service their customers, so customers are more likely to buy from franchise dealers. Therefore, dealers of the franchise dealer type may be associated with a weight that is higher than that for dealers of the independent dealer type. The machine learning model inherently learns from the historical data that franchise dealers may have a higher impact on the conversion rate.

Vehicle-related features can include: the vehicle model segment (e.g., SUV vs. sedan) and vehicle type (new or used).

In some embodiments, the VDS keeps track of the number of unique maker pages, how many people went through a process to arrive at a particular page, how many people have viewed a particular page, etc. The more unique maker pages viewed, the less likely the user has made up their mind about what they want and, therefore, is less likely to be interested in making a particular purchase.

Another indicator can be the number of times that a user has visited the website. For instance, if a user has visited the website several times in one day and viewed a particular maker page multiple times during that time period, this browsing history and behaviors could be an indication that the user is seriously considering purchasing a vehicle of that make. Conversely, if a user has visited a website several times, but the visits stretch over a long period of time (e.g., six weeks) and/or if the user has viewed multiple maker pages during that period of time, the user's browsing history and behaviors could be an indication that the user is not serious or not ready about making a purchase any time soon.

Depending upon implementation, the number of times a user has visited a website can be determined by tracking session information. For instance, a session may begin when a user opens a browser window and searches for a particular make, model, and year of a vehicle. The user may leave the browser window open for a period of time and come back (e.g., hours later) to the browser window. In some cases, refreshing the browser window can be considered as starting a new session. In some embodiments, the VDS may consider whether the user keeps coming back to the same page about a particular vehicle. If so, it may be a strong indicator that the user is serious about buying the particular vehicle.

Figure 8:
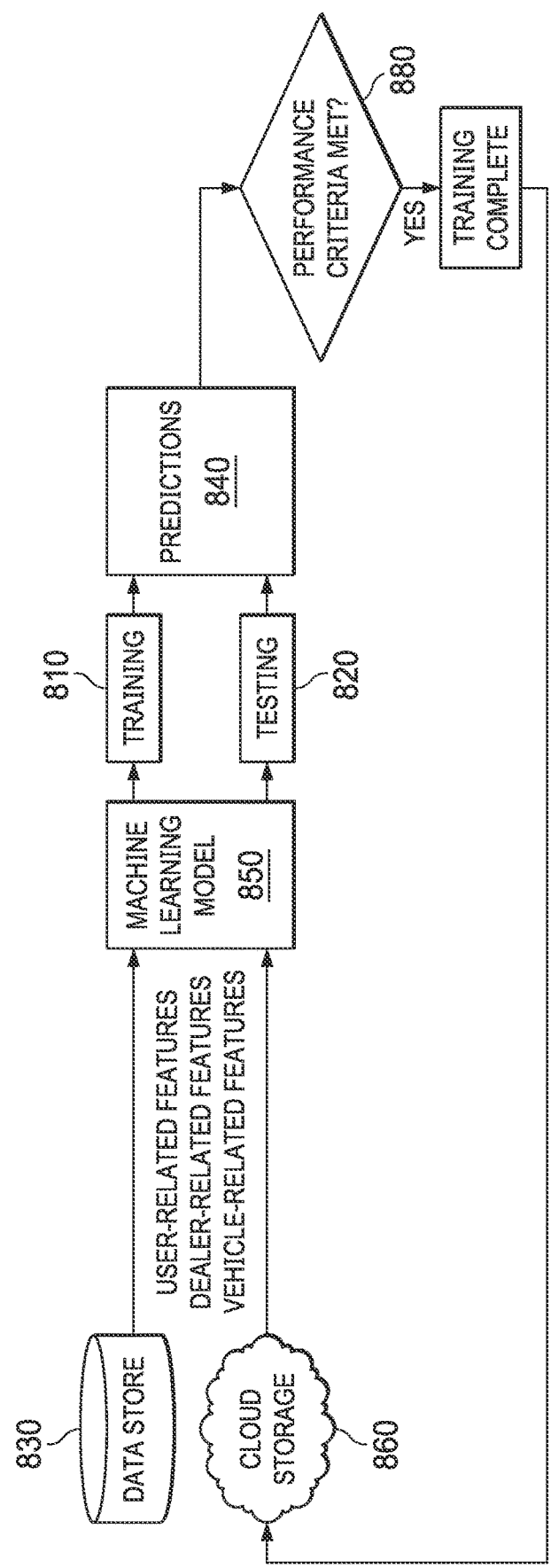
FIG. 8 is a flow diagram that illustrates an example of a machine learning modeling process in which the user-related features, dealer-related features, and vehicle-related features are provided as input to a machine learning model according to some embodiments disclosed herein.

These features are used by the VDS for machine learning modeling. FIG. 8 is a flow diagram that illustrates a non-limiting example of a machine learning modeling process 800 in which the user-related features, dealer-related features, and vehicle-related features are provided as input to a machine learning model 850, according to some embodiments disclosed herein. These features may be stored in a data store 830 and/or a cloud storage 860. In some embodiments, all the data points (e.g., user information, clickstream data, dealer close rate, etc.) are aggregated and merged into a single input file (e.g., a comma-separated value file), with each column corresponding to a feature.

In some embodiments, the conversion rate can be determined utilizing DSA approaches that determine a list of all possible dealers for a user looking for an item in the inventories of those dealers (e.g., a dealer that is the closest to the user, a dealer that offers the lowest price for the item, a dealer that has the highest close rate, etc.), sometimes with an ability to sort the dealers by price, relevance, or other feature, or allowing the user to filter results by price, distance, or other product attribute.

The datasets are divided into a training dataset and a test dataset. As alluded to above, the machine learning model may continuously undergo a training process 810 and a testing process 820. The training process may run once a week. Both the training dataset and the test dataset may continuously be updated so that they contain data from a current time period (e.g., past six months as of the date of running the training process). The machine learning model is then run on the test dataset in the testing process to see how well the machine learning model performs (e.g., by comparing predictions 840 generated by the machine learning model in the testing process with those generated by the machine learning model in the testing process). If the machine learning model meets the performance criteria (880), the training is complete.

The results can be stored and used to fine tune the machine learning model. As a non-limiting example, the machine learning model can comprise a high-performance machine learning library for gradient boosting on decision trees with categorical features. Gradient boosting decision trees are known to those skilled in the art and thus are not further described herein.

Once the training is complete, the machine learning model is ready to model and predict how likely a website visitor to the VDS website or a partner website is to make a purchase of a vehicle from a dealer through the respective website. Specifically, for each lead submission, the machine learning model takes as input the user-related features associated with the respective lead, the dealer-related features associated with a dealer of interest, and the vehicle-related features associated with a vehicle configuration and outputs a prediction on the probability of sale for the respective lead. As a non-limiting example, the machine learning modeling output can be a percentage value, referred to as the user value, between 0 and 100 representing the probability of sale. Outputs from the machine learning model can be stored in, for instance, a cloud-based storage.

FIG. 9 shows a non-limiting example of how the user value generated by a machine learning model for a lead can be used to compute a lifetime value of the lead according to some embodiments. Referring to FIG. 9, consider two leads: lead A and lead B. In the example of FIG. 9, both leads are submitted by the same user Abby to a website supported by the VDS. The VDS passes lead A to dealer X and lead B to dealer Y.

Suppose dealer X pays the website a monthly fee of $400 for each sale and lead A's user value (which represents the probability of sale associated with this lead submission) is 80%, the lifetime value of lead A is $320 (i.e., 80% of $400). Suppose dealer Y pays the website a monthly fee of $300 for each sale and lead B's user value is 10%, the potential lifetime value of lead B is $30 (i.e., 10% of $300). Next, all the leads that the user has submitted are aggregated and used to compute an overall lifetime value for the user.

Following the above example, suppose the user Abby has submitted two leads and the total lifetime values of the two leads add up to be $350 (i.e., $320 plus $30), the lifetime value for user Abby is $350. This lifetime value is user-oriented and not specific to any particular dealer. This provides stability to the lifetime value as the monthly fee may keep changing and some dealers may pay more and some may pay less over time. The lifetime value of a user is provided to a search engine, which already has the user's browsing history and search parameters. When user Abby first submitted a lead, the number of leads prior to this submission is zero.

Suppose 10,000 users visited a website supported by the VDS in a past time period (e.g., a month) and have registered or otherwise provided their PII to the website. The lifetime values for the 10,000 users are determined as described above. In some cases, a top percentage (e.g., 5%) may be selected as the most likely to convert. In some cases, the VDS is operable to analyze the behaviors of the top percentage of users and indicate to a search engine to return users who are similar to the top percentage of users and, thus, are also likely to convert.

Returning to FIG. 9, suppose that, through an Internet search engine, user Abby searched for a particular vehicle make and model (e.g., "Honda Civic") and another user John searched a different vehicle make and model (e.g., "Toyota Camry"). The search engine knows what information user Abby searched and knows that her search led her to a particular website. Likewise, the search engine knows what information user John searched and knows that his search led him also to the website. However, the search engine has no knowledge on the return on investment (ROI) of user Abby or user John.

To this end, the invention disclosed herein can augment the search engine's knowledge with the lifetime value of user Abby and the lifetime value of user John. This allows the search engine to learn that the search parameters used by the user Abby are likely to return a ROI that is higher than that of the user John. Users who use the same search parameters are likely to have a similar ROI. Thus, the search engine will try to send users who search keywords with higher lifetime values to the website (e.g., by presenting an ad about the website to those users). The search engine already has algorithms to identify users based on their search histories. The invention provides the search engine with the knowledge of how valuable a user is so that the next time when someone conducts a similar search, the search engine can rank the website higher in the search results and present the website to the user.

As a non-limiting example, the invention disclosed herein can augment the search engine's knowledge with the lifetime values of users using the search engine. Generally, for each user that uses the search engine, the search engine assigns a unique identifier (e.g., a clickstream identifier (ID), which is a uniquely identifiable string). As those skilled in the art can appreciate, a clickstream is the recording of areas of the screen that a user clicks while web browsing. As the user clicks anywhere in a web page, the user action creates a data point in the clickstream. Accordingly, a clickstream can contain data from user actions in browsing and/or interacting with a website. This data can include customer ID, time stamp, type of click event, name of a product, category of the product, price of the product, how long the user was on the website, and so on.

Users who also enter the search parameters "Honda Civic" like user Abby may end up having clickstreams similar to that of user Abby. This means that users who behave like user Abby and who search for "Honda Civic" may collectively have the same or similar lifetime values as that of user Abby. The machine learning model disclosed herein is trained to recognize users who interact with the website in a manner that is similar to user Abby and determine a lifetime value for each such user as described above.

In a batch process, the VDS may obtain all the clickstream IDs for one day (e.g., as a job) from the search engine and assign a corresponding ROI value (e., in a dollar amount) to each clickstream ID. In this way, each clickstream ID can have a corresponding lifetime value. The clickstream IDs and corresponding lifetime values can be aggregated in a comma-separated values (CSV) file in which each line of the CSV file is a data record (e.g., with a clickstream ID and a corresponding lifetime value). The CSV file is communicated to the search engine using, for instance, the Secure File Transfer Protocol. This single file is for consumption by the search server on which the search engine is run.

The search engine already has the history of what each user is searching for and, therefore, can identify users who use the same search parameters as user Abby (e.g., "Honda Civic"). With the additional information provided by the VDS, the search engine can identify users who use the same search parameters as user Abby and who has a lifetime value higher than those of other users and direct the users with higher lifetime values to the website which, in turn, improves the SEM processes.

Accordingly, in some embodiments, a VDS is operable to obtain user data, dealer data, and vehicle data from disparate sources and prepare datasets for training and testing a machine learning model. The datasets contain user-related features that capture user behaviors in browsing a website supported by the VDS, dealer-related features that facilitate selecting appropriate dealers per lead submission, and vehicle-related features that identify a particular vehicle model segment and a particular vehicle type. The machine learning model thus trained and tested can be used in a process for improving SEM. An example of this process is illustrated in FIG. 10.

Figure 10:
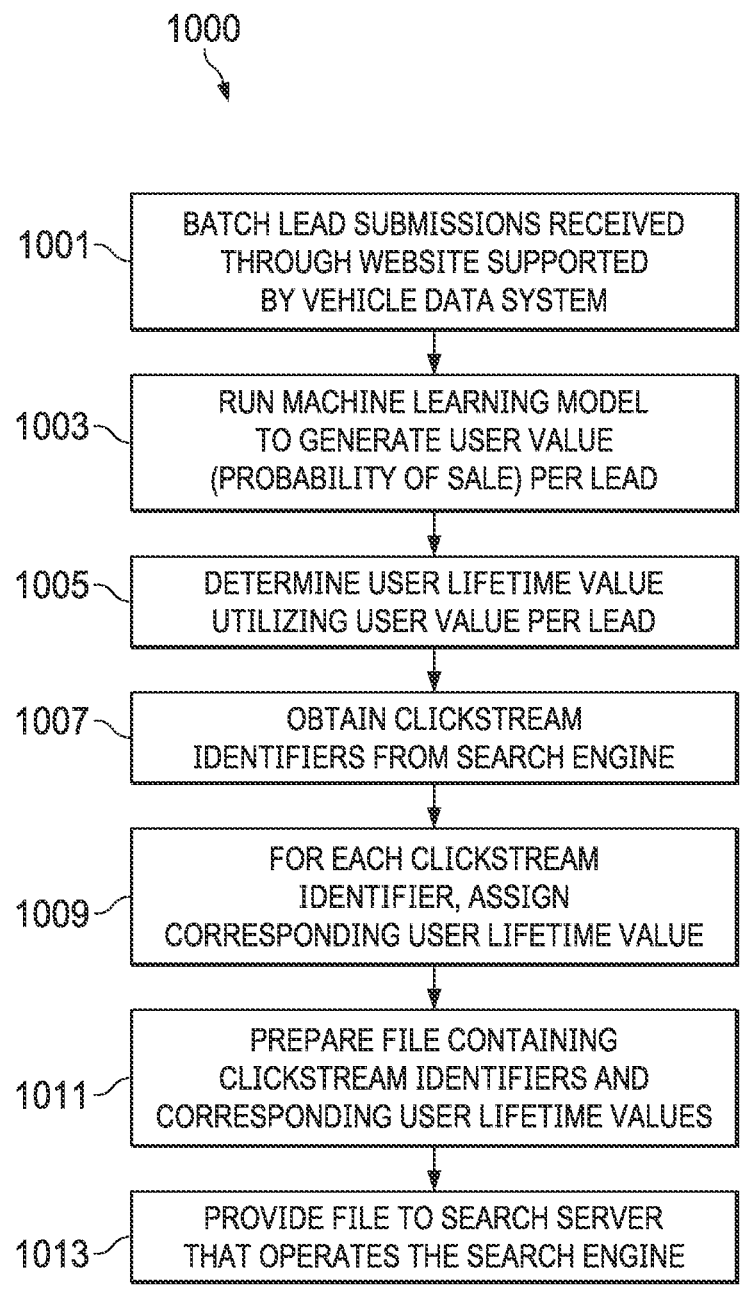
FIG. 10 is a flow chart illustrating a process for improving search engine marketing according to some embodiments disclosed herein.

In the example of FIG. 10, method 1000 includes batching, by a VDS, lead submissions received with a website supported by the VDS (1001). The VDS runs a machine learning model disclosed herein to model and predict a user value for each lead (1003). The user value is then used to determine a user lifetime value per lead (1005). The VDS obtains a batch of clickstream IDs from a search engine (1007) and, for each clickstream ID, assigns a corresponding user lifetime value (1009). The VDS aggregates clickstream IDs and corresponding user lifetime values in a file (1011) and communicates the file to a search server that operates the search engine (1013). In turn, the search engine utilizes the user lifetime values in preparing and/or prioritizing search results for users who searched the same keywords.

Figure 11:
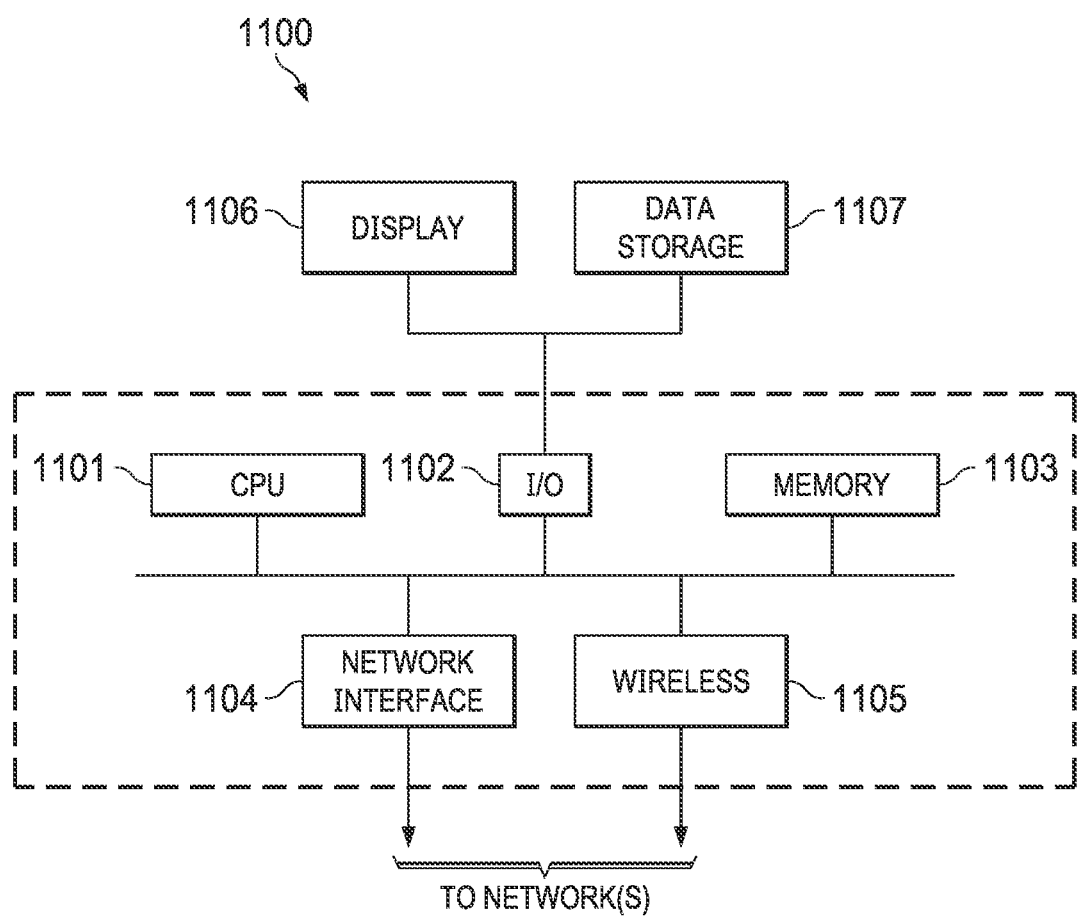
FIG. 11 depicts a diagrammatic representation of a data processing system for implementing an embodiment disclosed herein.

FIG. 11 depicts a diagrammatic representation of a data processing system for implementing an embodiment disclosed herein. As shown in FIG. 11, data processing system 1100 may include one or more central processing units (CPU) or processors 1101 coupled to one or more user input/output (I/O) devices 1102 and memory devices 1103. Examples of I/O devices 1102 may include, but are not limited to, keyboards, displays, monitors, touch screens, printers, electronic pointing devices such as mice, trackballs, styluses, touch pads, or the like. Examples of memory devices 1103 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1100 can be coupled to display 1106, information device 1107 and various peripheral devices (not shown), such as printers, plotters, speakers, etc. through I/O devices 1102. Data processing system 1100 may also be coupled to external computers or other devices through network interface 1104, wireless transceiver 1105, or other means that is coupled to a network such as a local area network (LAN), wide area network (WAN), or the Internet.

Embodiments will be better understood with reference to the enclosed Appendixes A-B. It should be understood that the illustrations and explanations in the Appendixes A-B are provided by way of example and that any limiting language such as must, should, requires, etc. should not be taken as limitations on embodiments generally.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. The scope of the present disclosure should be determined by the following claims and their legal equivalents.

What is claimed is:

1. A method for improving search results using machine learning, the method comprising:
   training a machine learning model, wherein the training of the machine learning model comprises:
   receiving input data from at least one of: a data store or a cloud storage;
   preparing datasets from the input data for training and testing the machine learning model, the datasets containing user-related features associated with lead submissions, dealer-related features associated with dealers, and vehicle-related features associated with vehicles;
   dividing the datasets into a training dataset and a test dataset;
   training the machine learning model using the training dataset, wherein the training produces first predictions of user values;

testing the machine learning model using the test dataset, wherein the testing produces second predictions of user values; and comparing the first predictions and the second predictions; and performing the training, the testing, and the comparing until a result of the comparing meets a performance criterion;

receiving, by a vehicle data system operating on a server machine, a lead submission from a user through a website supported by the vehicle data system, wherein the user becomes a lead through the lead submission and wherein the vehicle data system comprises the machine learning model;

determining, by the vehicle data system utilizing the trained machine learning model, a user value for the lead associated with the lead submission, wherein the user value represents a probability of the lead purchasing the vehicle from the dealer through the website supported by the vehicle data system;

determining, by the vehicle data system utilizing the trained machine learning model in conjunction with one or more factors, a user lifetime value for the lead based at least on the user value for the lead, the one or more factors comprising a multiplier;

obtaining, by the vehicle data system from a search engine on the Internet, clickstream identifiers, wherein each of the clickstream identifiers is associated with a respective visitor of a plurality of respective visitors of the website supported by the vehicle data system;

for each of the clickstream identifiers, assigning, by the vehicle data system utilizing the trained machine learning model, a corresponding user lifetime value for the respective visitor, wherein the machine learning model is trained to, for each lead submission, take as input user-related features associated with the respective visitor, dealer-related features associated with a dealer of interest, and vehicle-related features associated with a vehicle of interest and output a prediction that indicates how likely the respective visitor is to make a purchase of the vehicle of interest from the dealer of interest through the website supported by the vehicle data system;

aggregating, by the vehicle data system in a file, the clickstream identifiers and corresponding user lifetime values;

communicating, by the vehicle data system over the Internet, the file to a search server on which the search engine operates; and conducting, by the search engine, improved searches utilizing the user lifetime values such that the search engine is able to provide improved search results in response to search requests from user devices.

2. The method according to claim 1,
wherein the datasets contain the user-related features that capture user behaviors in browsing the website supported by the vehicle data system, the dealer-related features that facilitate selecting appropriate dealers per lead submission, and the vehicle-related features that identify a particular vehicle model segment and a particular vehicle type.

3. The method according to claim 1, further comprising: continuously updating the training dataset and the test dataset so that the machine learning model is trained and tested on data from a current time period.

4. The method according to claim 1, further comprising: training and testing the machine learning model on a periodic basis.

5. The method according to claim 1, wherein the machine learning model implements an algorithm for gradient boosting on decision trees.

6. The method according to claim 1, wherein the file has a comma-separated values format and wherein each line of the file is a data record containing a clickstream identifier and a corresponding lifetime value.

7. The method according to claim 1, wherein the user lifetime value for the lead is determined by multiplying the user value for the lead with a dealer-specific fee.

8. A vehicle data system for improving search results using machine learning, the vehicle data system comprising:
a processor;
a non-transitory computer-readable medium; and
stored instructions translatable by the processor for:
training a machine learning model, wherein the training of the machine learning model comprises:
receiving input data from at least one of: a data store or a cloud storage;
preparing datasets from the input data for training and testing the machine learning model, the datasets containing user-related features associated with lead submissions, dealer-related features associated with dealers, and vehicle-related features associated with vehicles;
dividing the datasets into a training dataset and a test dataset;
training the machine learning model using the training dataset, wherein the training produces first predictions of user values;
testing the machine learning model using the test dataset, wherein the testing produces second predictions of user values; and
comparing the first predictions and the second predictions; and
performing the training, the testing, and the comparing until a result of the comparing meets a performance criterion;
receiving a lead submission from a user through a website supported by the vehicle data system, wherein the user becomes a lead through the lead submission and wherein the vehicle data system comprises the machine learning model;
determining, utilizing the trained machine learning model, a user value for the lead associated with the lead submission, wherein the user value represents a probability of the lead purchasing the vehicle from the dealer through the website supported by the vehicle data system;
determining, utilizing the trained machine learning model in conjunction with one or more factors, a user lifetime value for the lead based at least on the user value for the lead, the one or more factors comprising a multiplier;
obtaining, from a search engine on the Internet, clickstream identifiers, wherein each of the clickstream identifiers is associated with a respective visitor of a plurality of respective visitors of the website supported by the vehicle data system;
for each of the clickstream identifiers, assigning, utilizing trained the machine learning model, a corresponding user lifetime value for the respective visitor, wherein the machine learning model is trained to, for each lead submission, take as input user-related features associated with the respective visitor, dealer-related features associated with a dealer of interest, and vehicle-related features associated with a vehicle of interest and output a prediction that indicates how likely the respective visitor is to make a purchase of the vehicle of interest from the dealer of interest through the website supported by the vehicle data system;

aggregating, in a file, the clickstream identifiers and corresponding user lifetime values;

communicating, over the Internet, the file to a search server on which the search engine operates; and conducting, by the search engine, improved searches utilizing the user lifetime values such that the search engine is able to provide improved search results in response to search requests from user devices.

9. The system of claim 8, wherein the datasets contain the user-related features that capture user behaviors in browsing the website supported by the vehicle data system, the dealer-related features that facilitate selecting appropriate dealers per lead submission, and the vehicle-related features that identify a particular vehicle model segment and a particular vehicle type.

10. The system of claim 8, wherein the stored instructions are further translatable by the processor for:

continuously updating the training dataset and the test dataset so that the machine learning model is trained and tested on data from a current time period.

11. The system of claim 8, wherein the stored instructions are further translatable by the processor for:

training and testing the machine learning model on a periodic basis.

12. The system of claim 8, wherein the machine learning model implements an algorithm for gradient boosting on decision trees.

13. The system of claim 8, wherein the file has a comma-separated values format and wherein each line of the file is a data record containing a clickstream identifier and a corresponding lifetime value.

14. The system of claim 8, wherein the user lifetime value for the lead is determined by multiplying the user value for the lead with a dealer-specific fee.

15. A computer program product for improving search results using machine learning, the computer program product comprising a non-transitory computer-readable medium storing instructions translatable by a processor of a vehicle data system for:

training a machine learning model, wherein the training of the machine learning model comprises:

receiving input data from at least one of: a data store or a cloud storage;

preparing datasets from the input data for training and testing the machine learning model, the datasets containing user-related features associated with lead submissions, dealer-related features associated with dealers, and vehicle-related features associated with vehicles;

dividing the datasets into a training dataset and a test dataset;

training the machine learning model using the training dataset, wherein the training produces first predictions of user values;

testing the machine learning model using the test dataset, wherein the testing produces second predictions of user values; and comparing the first predictions and the second predictions; and performing the training, the testing, and the comparing until when a result of the comparing meets a performance criterion;

receiving a lead submission from a user through a website supported by the vehicle data system, wherein the vehicle data system comprises the machine learning model;

determining, utilizing the trained machine learning model, a user value for the lead associated with the lead submission, wherein the user becomes a lead through the lead submission and wherein the user value represents a probability of the lead purchasing the vehicle from the dealer through the website supported by the vehicle data system;

determining, utilizing the trained machine learning model in conjunction with one or more factors, a user lifetime value for the lead based at least on the user value for the lead, the one or more factors comprising a multiplier;

obtaining, from a search engine on the Internet, clickstream identifiers, wherein each of the clickstream identifiers is associated with a respective visitor of a plurality of respective visitors of the website supported by the vehicle data system;

for each of the clickstream identifiers, assigning, utilizing the trained machine learning model, a corresponding user lifetime value for the respective visitor, wherein the machine learning model is trained to, for each lead submission, take as input user-related features associated with the respective visitor, dealer-related features associated with a dealer of interest, and vehicle-related features associated with a vehicle of interest and output a prediction that indicates how likely the respective visitor is to make a purchase of the vehicle of interest from the dealer of interest through the website supported by the vehicle data system;

aggregating, in a file, the clickstream identifiers and corresponding user lifetime values;

communicating, over the Internet, the file to a search server on which the search engine operates; and conducting, by the search engine, improved searches utilizing the user lifetime values such that the search engine is able to provide improved search results in response to search requests from user devices.

16. The computer program product of claim 15, wherein the datasets contain the user-related features that capture user behaviors in browsing the website supported by the vehicle data system, the dealer-related features that facilitate selecting appropriate dealers per lead submission, and the vehicle-related features that identify a particular vehicle model segment and a particular vehicle type.

17. The computer program product of claim 15, wherein the instructions are further translatable by the processor for:

continuously updating the training dataset and the test dataset so that the machine learning model is trained and tested on data from a current time period.

18. The computer program product of claim 15, wherein the instructions are further translatable by the processor for:

training and testing the machine learning model on a periodic basis.

19. The computer program product of claim 15, wherein the machine learning model implements an algorithm for gradient boosting on decision trees.

20. The computer program product of claim 15, wherein the file has a comma-separated values format and wherein each line of the file is a data record containing a clickstream identifier and a corresponding lifetime value.

* * * * *